US008418255B2

(12) United States Patent
Oelsner

(10) Patent No.: US 8,418,255 B2
(45) Date of Patent: Apr. 9, 2013

(54) METHOD FOR THE SECURE TRANSMISSION OF OPERATING DATA

(75) Inventor: Tom Oelsner, Frankfurt am Main (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 931 days.

(21) Appl. No.: 11/706,917

(22) Filed: Feb. 13, 2007

(65) Prior Publication Data

US 2007/0198833 A1    Aug. 23, 2007

(30) Foreign Application Priority Data

Feb. 13, 2006 (DE) .......................... 10 2006 006 438

(51) Int. Cl.
*H04L 29/06* (2006.01)
*G06F 7/04* (2006.01)
*G06F 17/30* (2006.01)
*H04N 7/16* (2011.01)

(52) U.S. Cl.
USPC .............................. 726/26; 713/160; 713/176

(58) Field of Classification Search .................... None
See application file for complete search history.

(56) References Cited

U.S. PATENT DOCUMENTS

| 5,325,156 A | 6/1994 | Ulinski |
| 6,529,692 B1 | 3/2003 | Haines et al. |
| 8,054,970 B2 | 11/2011 | Kimura |
| 2001/0003827 A1 * | 6/2001 | Shimamura .................... 709/206 |
| 2002/0073356 A1 * | 6/2002 | Katayama et al. ................. 714/4 |
| 2002/0184495 A1 * | 12/2002 | Torii et al. ...................... 713/160 |
| 2005/0273616 A1 * | 12/2005 | Nishio ........................... 713/176 |
| 2006/0256367 A1 * | 11/2006 | Wei ............................... 358/1.15 |
| 2007/0035763 A1 | 2/2007 | Bard et al. |
| 2008/0267402 A1 | 10/2008 | Kimura |

FOREIGN PATENT DOCUMENTS

| CN | 1708000 A | 12/2005 |
| DE | 101 54 600 A1 | 5/2002 |
| EP | 0 599 523 B1 | 6/1994 |
| EP | 1 550 921 A1 | 7/2005 |
| JP | 2005025616 A | 1/2005 |
| JP | 2005275474 A | 10/2005 |
| JP | 2005301798 A | 10/2005 |
| JP | 2005339571 A | 12/2005 |
| JP | 2005346702 A | 12/2005 |
| JP | 2006041625 A | 2/2006 |
| WO | 2006009238 A1 | 1/2006 |
| WO | 2007019565 A2 | 2/2007 |

OTHER PUBLICATIONS

European Office Action dated Feb. 17, 2009.
Japanese Office Action dated Jul. 6, 2011. English translation.

* cited by examiner

*Primary Examiner* — Shin-Hon Chen
(74) *Attorney, Agent, or Firm* — Laurence A. Greenberg; Werner H. Stemer; Ralph E. Locher

(57) ABSTRACT

A method for transmitting operating data of machines in the graphics industry is performed via a communications network that is accessible to the public and the operating data is transmitted to at least one management computer that can be reached via the public communications network. The operating data from the machine in the graphics industry is stored in encrypted form in at least one computer assigned to the machine, and the encrypted operating data is transmitted to the management computer via the communications network that is accessible to the public and is stored on the management computer.

17 Claims, 3 Drawing Sheets

METHOD FOR THE SECURE TRANSMISSION OF OPERATING DATA

CROSS-REFERENCE TO RELATED APPLICATION

This application claims the priority, under 35 U.S.C. §119, of German application DE 10 2006 006 438.0, filed Feb. 13, 2006; the prior application is herewith incorporated by reference in its entirety.

BACKGROUND OF THE INVENTION

Field of the Invention

The present invention relates to a method for the transmission of operating data in machines in the graphics industry via a communications network that is accessible to the public to at least one management computer that can be reached via the public communications network.

Modern printing presses and other machines in the graphics industry increasingly have components controlled by computers. The equipment of printing presses with computers is an expression of the continuously progressing automation in the operation of modern printing presses. Both the printing press itself and the electronic control components need regular maintenance, however, which a few years ago had to be carried out by a responsible service technician on site at the premises of the machine customer. In recent years, innovative remote maintenance methods have increasingly been implemented, with the aid of which the visit of service technicians could be reduced to a minimum. The nub of these remote maintenance methods is that specific operating parameters of a printing press can be transmitted from the operator of the printing press via a data network to the manufacturer of the printing press, which results in that the manufacturer is given the possibility of evaluating the current state of the printing press and, if necessary, detecting a need for maintenance and repair. Depending on the need detected, service personnel are then sent to the customer, should this be necessary. In addition to the transmission of operating data from the printing press of the customer to the manufacturer, the converse route can also be followed in order to transmit data from the manufacturer to the customer. In this case, the manufacturer can change settings on the printing press of the customer remotely, in order for example to solve outstanding problems.

Such a remote maintenance system for copiers is disclosed by European patent EP 0 599 523 B1, corresponding to U.S. Pat. No. 5,325,156. In the patent, a method is described with which operating data from a copier can be transmitted via a modem to the computer of the manufacturer, the data transmission takes place at predefined times or upon request from the manufacturer. If a defect occurs in a printing press of a customer, the customer is able to build up a communications link to the manufacturer via a user interface for the purpose of remote diagnosis and remote maintenance, the identity of the machine and operating data being automatically sent to the manufacturer with or without the attachment of additional information from the operator. In this case, making telephone contact in order to initiate the data transport from the customer to the manufacturer is no longer necessary. As a result of the transmission of the machine identity, the manufacturer can immediately detect which machine and which customer are involved. However, this system has the disadvantage that the transmission of operating data to the manufacturer can basically be started only by the customer. This is on the one hand also expedient from aspects of security, since in this way it is ensured that no third party is able to initiate the data transmission from the computer of the customer to an unauthorized computer. However, the present method in European patent EP 0 599 523 B1 also has the disadvantage that the transmission of the data from the computer of the printing press to the computer of the manufacturer is carried out without security. Therefore, as soon as the data transmission from the printing press computer to the computer of the manufacturer has been set in motion by the customer, there is the danger that unauthorized persons will manipulate and record the data.

SUMMARY OF THE INVENTION

It is accordingly an object of the invention to provide a method for the secure transmission of operating data which overcomes the above-mentioned disadvantages of the prior art methods of this general type, which permits very secure data transmission from computers of print shop operators to computers of a printing press manufacturer.

The method according to the invention for the transmission of operating data in machines in the graphics industry via a communications network that is accessible to the public to a management computer of the manufacturer can in principle be used for all machines in the graphics industry which have an electronic control computer and an appropriate communications interface for connection to a communications network. These can be printing presses, punches and other machines for further print processing which are able to construct a connection to the Internet via a commercially available PC. According to the invention, the machine in the graphics industry is assigned at least one computer which, continuously or at specific time intervals, logs and stores operating data from the machine. However, the operating data is not only simply stored but additionally encrypted, so that, in the event of access by unauthorized persons to the computer of the machine, no insight can be gained into the machine data. The operating data encrypted in this way is then transmitted via a communications network that is accessible to the public, such as the Internet, to the management computer of the manufacturer of the machine and stored there. As a result of the immediate encryption of the operating data on the machine computer, the highest possible security in relation to access by unauthorized persons is made possible.

This is all the more important since the machines in a print shop have in the meantime normally being connected to one another via a network such as an intranet, which is in turn connected to the Internet. In this case, if protective measures are lacking, it is relatively simple for spying on data on the computers of the machines present in the print shop to be carried out. However, this is effectively prevented by the encrypted storage according to the invention of operating data on the computer assigned to the respective machine, since unauthorized persons cannot do anything with the encrypted data. The appropriate key is known only to the manufacturer of the machine, so that only the manufacturer is able to decrypt and evaluate the operating data on the management computer. In this way, it is also intended to relieve the operators of a printing press from the worry that, as a result of the remote maintenance and transmission of operating data from the printing press to the manufacturer of the printing press, a possible way may be created in which competitors could get to the operating data, in order in this way to obtain knowledge relating to jobs and procedures in a print shop.

In a first refinement of the invention, provision is made for the operating data to be transmitted in encrypted form via the communications network that is accessible to the public. This additional encrypted transmission of the operating data already deposited on the machine computer in encrypted form further increases the security. By the encrypted transmission of the data, any change to the encrypted operating data on the transmission paths via the communications network that is accessible to the public can be detected and the data transmission can be aborted if desired if a change is established. This is because a change to the data during the transmission allows it to be suspected that either errors have occurred or that someone is attempting to manipulate the data.

Furthermore, provision is made for the operating data to be protected by a code against being changed before the storage in the computer assigned to the machine from the graphics industry. In this case, both symmetrical and asymmetrical encryption methods can be applied, asymmetrical methods with public/private key algorithms being preferred. Furthermore, before the storage, the data can be provided with a checksum, what is known as a hash code, and thus protected against being changed. This ensures that the data obtained during the operation of a printing press is stored only in the encrypted state and protected reliably against access by unauthorized persons.

In a particularly advantageous refinement of the invention, provision is made for the operating data to be subjected to a plausibility check before the storage in the computer assigned to the machine from the graphics industry. By using the plausibility check, it is possible to ensure that only sensible operating data from the printing press are acquired and any manipulations during the acquisition of operating data are detected. Should manipulations have been made to individual sensors belonging to the machine or errors have occurred during the acquisition, this can be detected by the plausibility check, an appropriate comment can be made in the corresponding file and reported to the manufacturer. In addition, the failure of sensors can be detected in this way, whereupon appropriate service or maintenance measures can be initiated.

Provision is advantageously made for the management computer to be provided with a digital signature and for the operating data from the computer assigned to the machine in the graphics industry to be transmitted via the public communications network only to a computer which has the same digital signature. The introduction of such a signature reliably prevents the operating data stored in the computer assigned to the machine from being passed on to unauthorized third parties. In this way, the operating data can be transmitted only to computers which are provided with an appropriate digital signature; in this case these are only management or service computers of the manufacturer of the respective machine which are provided for this purpose. Thus, neither competitive print shops nor competitive manufacturers have the possibility of gaining access to the operating data of a third-party machine.

Provision is further made for the successful reception of the operating data by the management computer to be signaled to the computer assigned to the machine from the graphics industry via an acknowledgment signal. By using such an acknowledgment signal to the machine computer, the proper transmission of the operating data to the management computer of the manufacturer can be checked. Only if the transmission of the operating data from the management computer is marked as having been completed successfully is the acknowledgment signal output to the computer on the machine of the customer. The successfully received acknowledgment signals are stored on the computer of the customer, so that the successful data transmission to the management computer of the manufacturer can be verified at any time on the computer. This ensures that the data needed for the successful maintenance of the machine has also actually arrived at the manufacturer and, if appropriate, the necessary maintenance and repair measures have been detected by the manufacturer. Should one or more acknowledgment signals not reach the machine computer, then this means that the data transmission has failed in one or more cases. Since, in this case, there is the danger that the machine will not be maintained correctly on account of the missing data transmission from the manufacturer, the machine computer can be programmed in such a way that, in the absence of one or more acknowledgment signals, the machine is shut down in order to prevent the occurrence of irreparable damage to the machine. At least, critical functions of the machine can be shut down step by step, so that at least endangering the operating personnel in the event of the absence of maintenance interventions by the manufacturer can be avoided.

In one refinement of the invention, provision is made for fixed transfer times to be assigned to the computer assigned to the machine from the graphics industry, at which times the computer transmits operating data to the management computer. In this case, either the fixed transmission times are programmed into the machine computer or the appropriate times at which the computer transmits operating data to the management computer are predefined to the machine computer by the management computer. If, at the times predefined in this way, a transmission of operating data is missing, then this is initially registered and logged by the management computer. In addition, a message can be sent back from the management computer to the machine of the customer, in order if appropriate to shut down safety-relevant functions or the entire machine, in order to prevent the endangering of the operating personnel or irreparable damage to the machine. While, in the embodiment mentioned previously, these staged safety measures are triggered when the acknowledgment signal from the machine computer is absent, in this embodiment the safety measures are triggered by the management computer of the manufacturer.

In order to protect the management computer and the machine computer against unauthorized accesses to data, it is advantageous if both the management computer and the machine computer are isolated from the communications network that is accessible to the public by an access protection device. In this case, both the management computer and the machine computer are in each case protected from the Internet by a firewall, so that no access to the computer is possible, at least from the Internet. If a plurality of machines or computers in a print shop are linked to one another via an intranet, then the firewall is installed between the print shop intranet and the Internet. By using these security measures, the data security both at the print shop operators and at the manufacturer can be improved further.

Other features which are considered as characteristic for the invention are set forth in the appended claims.

Although the invention is illustrated and described herein as embodied in a method for the secure transmission of operating data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
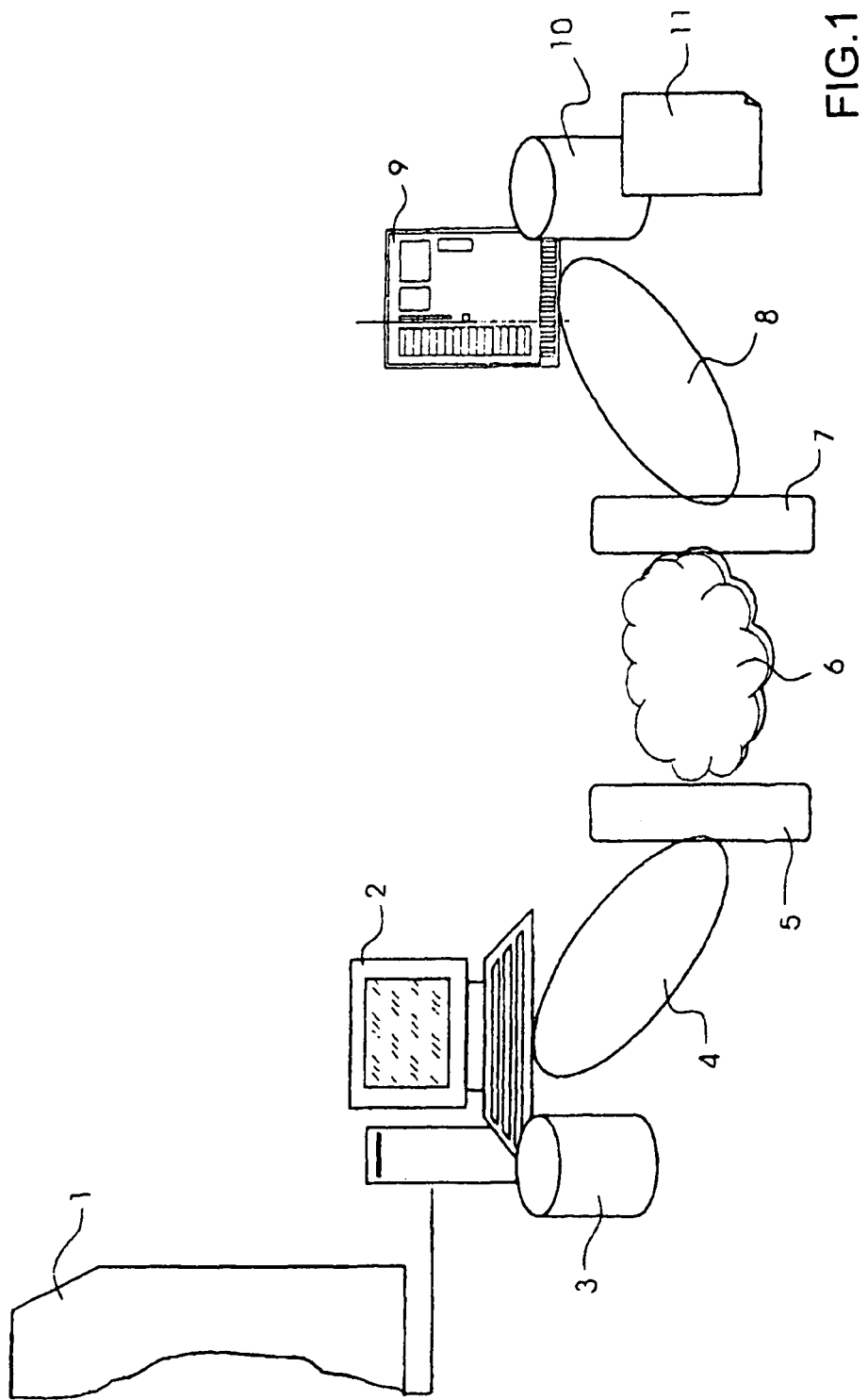
FIG. 1 is an illustration of a computer of a printing press which is able to communicate with a management computer of a printing press manufacturer via the Internet according to the invention.

Referring now to the figures of the drawing in detail and first, particularly, to FIG. 1 thereof, there is shown, at the left-hand edge, a printing press 1 which has a control desk computer 2. The control desk computer 2 of the printing press controls all the functions and operating sequences of the printing press 1 and makes it possible for the operating personnel to perform the entries necessary for a print job. The control desk computer 2 has a data memory 3 for the storage of operating data of the printing press 1. In this case, the operating data of the printing press 1 are acquired continuously or at specific time intervals via sensors in the printing press 1 and stored in the data memory 3. The control desk computer 2 is connected to a local network 4 of a print shop, so that the control desk computer 2 can communicate with other machines in the print shop. Such a local network can be an intranet or a wire-bound LAN or a wire-free WLAN network. The local network 4 is isolated from the Internet 6, which is accessible to the public, by a firewall 5, so that unauthorized persons have no access to the data in the local network 4 of the print shop. At the premises of the manufacturer of the printing press 1 there is a management computer 9 for accepting and evaluating the operating data acquired by the control desk computer 2 of the printing press 1. For this purpose, the management computer 9 likewise has a data memory 10. In the data memory 10, in addition to the acquired operating data, licenses for individual functions of the printing press 1 can additionally be stored. The management computer 9 in FIG. 1 is also connected to a local network 8 of the manufacturer, which in turn is separated off from the Internet 6 by a firewall 7.

During the transmission of operating data from the control desk computer 2 to the management computer 9, the operating data is transmitted via the local network 4 of the print shop through the firewall 5 of the print shop into the Internet 6 and, from there, is sent on through the firewall 7 of the manufacturer to the local network 8 of the manufacturer. At the end, it reaches the management computer 9 and is likewise stored there. However, the transmission of the operating data takes place only when the procedure has been authorized appropriately and the computers involved 2, 9 have been identified as admissible. The data transmission between the computers 2, 9 takes place only in an encrypted manner, so that unauthorized persons have no access to the data during the data transmission via the Internet. To this end, known SSL encryption can be applied. In the opposite way, appropriate enabling of functions of the printing press 1 can be undertaken from the management computer 9 to the control desk computer 2 if the operator of the printing press 1 has the appropriate licenses to enable the functions. These license authorizations are stored in a separate file 11 on the management computer 9, which contains the contract information 11 between the manufacturer and the operator of the printing press 1. If appropriate contract information is present, then the management computer 9 can enable the admissible functions by transmitting an appropriate signal to the control desk computer 2 of the printing press 1.

Figure 2:
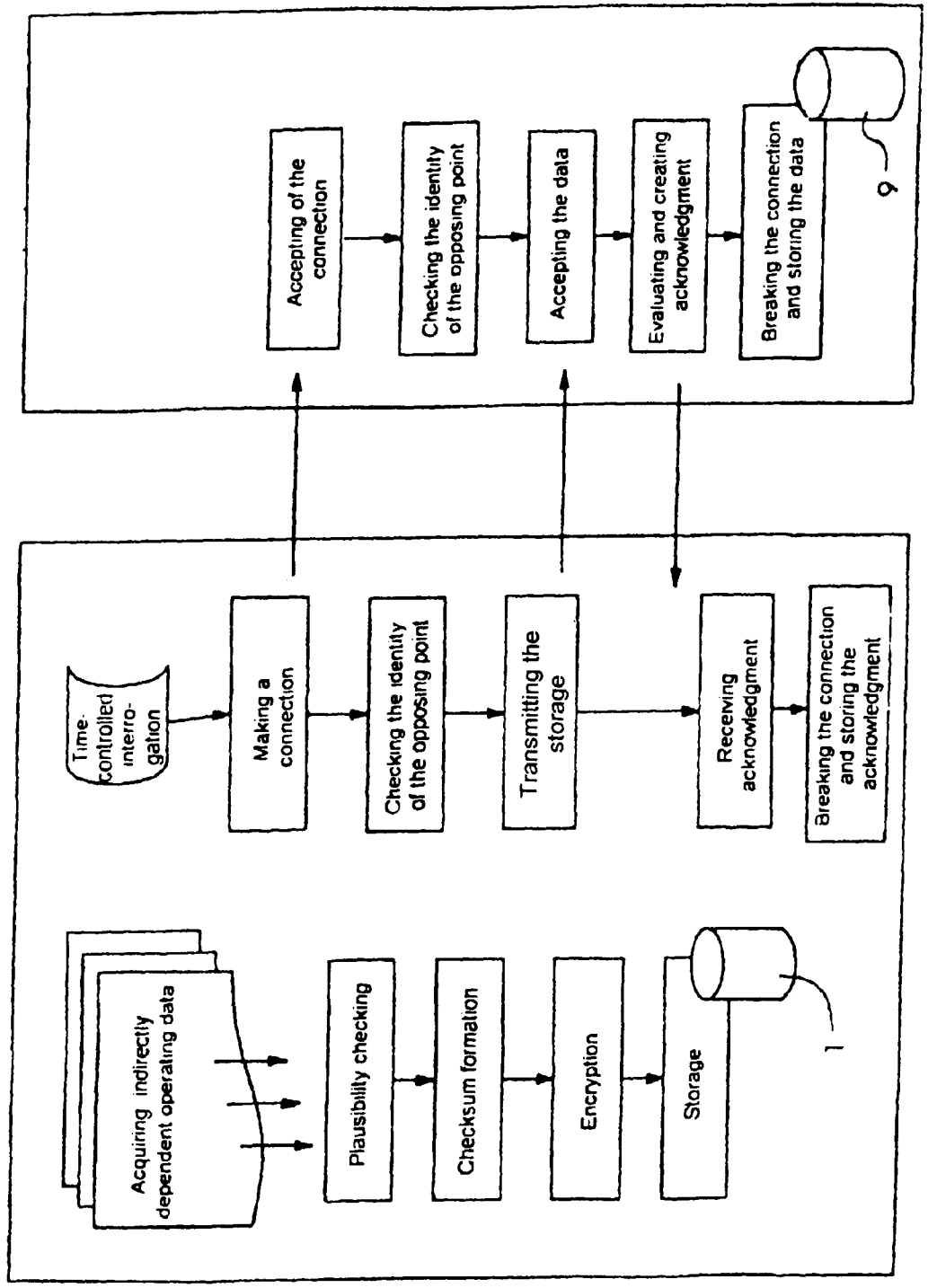
FIG. 2 is a flowchart relating to a sequence of a transmission of operating data.

FIG. 2 shows a sequence of a transmission of operating data from the printing press 1 to the management computer 9. First, in the printing press 1, by the sensors present there or the entries for the operating personnel relating to the respective print job, registered by the computer 2 of the printing press, the necessary operating data is acquired continuously or at specific time intervals. Before the storage of the operating data, this is first checked for plausibility in the control desk computer 2 of the printing press. In this case, if no errors or conspicuities can be determined, the operating data is provided with a checksum of a hash code and protected against being changed. In addition, the operating data protected in this way is protected against unauthorized accesses by an asymmetrical encryption method. For the purpose of encryption, a digital signature from the manufacturer is used; in the asymmetrical method the control desk computer 2 is able only to write the encrypted data but not to read it. In this way, manipulation of the stored operating data by the operating personnel on the printing press 1 is impossible. Either a reporting plan is stored in the control desk computer 2 of the printing press 1 or one such is transmitted to the control desk computer 2 by the management computer 9. The reporting plan defines the times at which the control desk computer 2 must make a connection to the management computer 9 in order to transmit operating data. If a predefined time has been reached, then the connection to the management computer 9 is made via the Internet 6. In this case, first of all the identity of the opposing point is checked on the machine computer 2, so that it is ensured that unauthorized third parties cannot get at the operating data. The same procedure is carried out by the management computer 9; here, too, the identity of the control desk computer 2 is checked first; if the check is carried out successfully in the control desk computer 2 and in the management computer 9, the data from the printing press 1 stored in encrypted form is transmitted to the management computer 9. The latter first stores the data and then performs an evaluation. If the transmission of the data was successful, the management computer 9 sends an acknowledgment signal back to the control desk computer 2. As soon as the control desk computer 2 has received the acknowledgment signal, it breaks the connection to the management computer 9 and stores the acknowledgment in its data memory. In this way, the control desk computer 2 has a log about all the data interrogations that have been carried out by the management computer 9 of the manufacturer. After the acknowledgment signal has been output, the management computer 9 also breaks the connection to the control desk computer 2 and stores the received data in the data memory 10. Therefore, the operating data has been transmitted securely from the machine computer 2 to the management computer 9.

Figure 3:
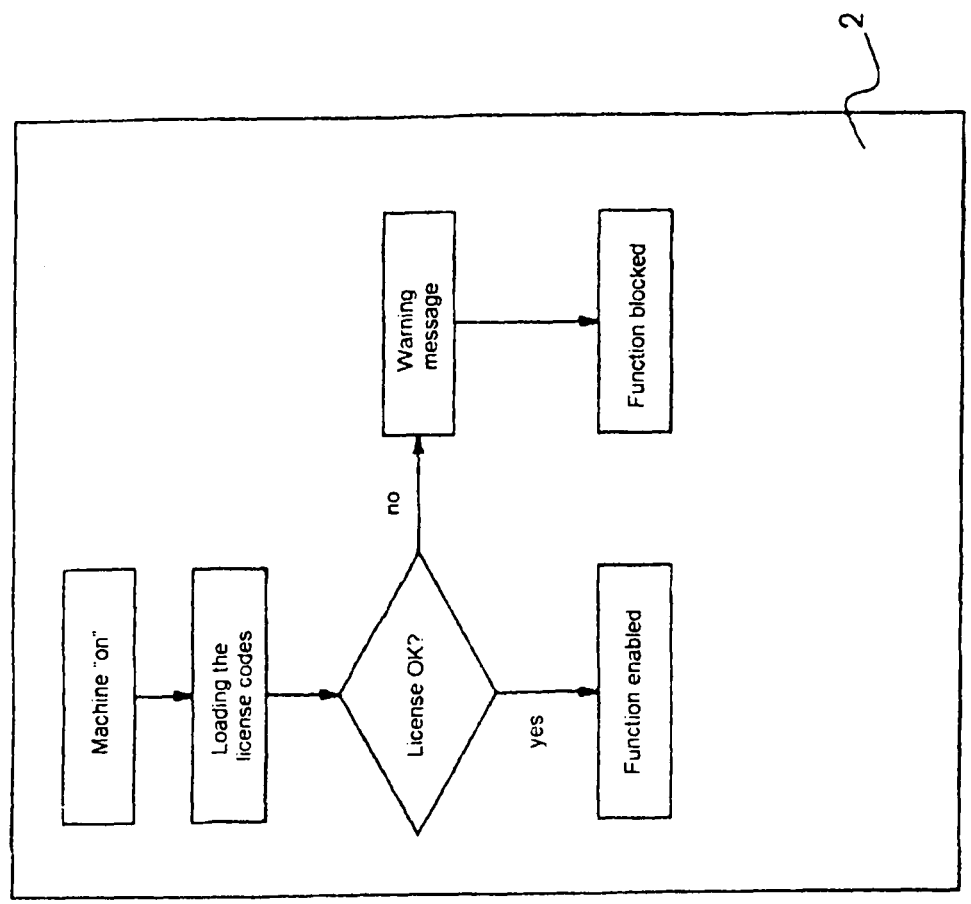
FIG. 3 is a flowchart showing the sequence relating to enabling a specific function of a printing press.

FIG. 3 depicts the checking of licenses by the manufacturer during the commissioning of specific functions on a printing press 1. Here, licenses are to be understood to mean enabling specific functions which have already been stored in the software of the printing press 1 in the control desk computer 2 at the factory but are enabled by the manufacturer only against appropriate payment or on the basis of contractual agreements. When the printing press 1 is switched on by the operating personnel, all the license codes stored in the control desk computer 2 of the printing press are first loaded into the working memory for checking. Should not all the functions be enabled by appropriate licenses, these functions are indicated by a warning message or that function which has just been selected by the operating personnel but is not licensed is provided with a warning message. After the warning message has been output, the function is blocked. It is therefore not possible for the operating personnel to commission unlicensed functions on the printing press 1. However, if the functions are licensed properly, then these are enabled appropriately and can be used.

In the software of the control desk computer 2, it is possible to provide a possibility of acquiring further licenses in the exchange with the management computer 9 of the manufacturer. In this case, the operator of the printing press 1 is able to select on the control desk computer 2, via a monitor and an appropriate input device such as a mouse, keyboard or touch screen, the desired functions that have not yet been enabled and to direct a request to the management computer 9 of the manufacturer. In a return message, the possible costs to enable the desired functions are then indicated to the operator of the control desk computer 2 of the printing press, which costs the operator then either confirms or rejects. If the operator rejects, the corresponding functions remain blocked but, if he agrees, then the appropriate license codes are sent by the management computer 9 via the Internet 6 to the control desk computer 2 and stored there. These license codes are also appropriately encrypted, so that they are protected against manipulations by the operator of the printing press 1. Following the transmission of the license codes, the corresponding function on the printing press 1 is enabled and can be used from then on. The payment of the functions enabled can then be balanced automatically by the management computer 9 with the service contract of the operator of the printing press 1, so that an appropriately increased service charge becomes due. However, it is also possible to make the payment directly when the license is downloaded by specifying a debit account or a credit card number belonging to the operator of the printing press 1. In this way, it is possible to provide all the functions of a printing press 1 and to supply them to the customer but not to enable these as standard, and in this way to be able to offer the machine at a more beneficial price. If it transpires that the operator of the printing press 1 has an additional need for functions, then these functions do not have to be retrofitted first in a cumbersome manner, but can be enabled online. This saves the use of service personnel, who otherwise would have to enable these functions only by the installation of the corresponding software on site at the premises of the customer. It is additionally possible to acquire specific licenses for only a specific time period if specific print jobs which make these functions necessary have to be carried out. The functions acquired for a specific limited time period can then be offered and acquired at a correspondingly more beneficial price. As soon as the desired time period has expired, the functions on the control desk computer 2 of the printing press 1 are blocked again and can no longer be used.

With the present invention, it is therefore not only possible to provide maximum protection of operating data which are transmitted to the manufacturer for the purpose of monitoring and for the purpose of carrying out service measures, but it is also possible to enable licenses for specific functions of the printing press without the use of service technicians. The encryption techniques used ensure that no manipulations by unauthorized persons are possible.

I claim:

1. A method for transmitting operating data of machines in the graphics industry, which comprises the steps of:
    connecting at least one management computer to a public communications network being accessible to the public;
    acquiring operating data by sensors in a machine of the graphics industry;
    encrypting the operating data acquired in the acquiring step before storing for a very first time in any control computer coupled to the machine resulting in encrypted operating data;
    transmitting the encrypted operating data to the management computer via the public communications network; and
    storing the encrypted operating data in the management computer.

2. The method according to claim 1, which further comprises encryptedly transmitting the encrypted operating data via the public communications network that is accessible to the public.

3. The method according to claim 1, which further comprises protecting the operating data by a code against being changed before storage in the control computer.

4. The method according to claim 1, which further comprises subjecting the operating data to a plausibility check before storage in the control computer.

5. The method according to claim 1, which further comprises:
    providing the management computer with a digital signature; and
    transmitting the operating data from the control computer via the public communications network only to a computer which has the same digital signature.

6. The method according to claim 1, which further comprises signaling a successful reception of the encrypted operating data by the management computer to the control computer via an acknowledgment signal.

7. The method according to claim 1, which further comprise assigning fixed transfer times to the control computer, at which times the control computer transmits the encrypted operating data to the management computer.

8. The method according to claim 7, which further comprises registering and logging a failure of a transmission of the encrypted operating data at a predefined transmission time by the management computer.

9. The method according to claim 7, which further comprises in an absence of a transmission of the encrypted operating data to the management computer at predefined transmission times, sending back a message from the management computer via the public communications network to the control computer.

10. The method according to claim 9, which further comprises in an absence of the transmission of the encrypted operating data to the management computer, blocking functions of the machine in the graphics industry.

11. The method according to claim 1, which further comprises isolating the control computer assigned to the machine in the graphics industry from the public communications network by use of an access protection device.

12. The method according to claim 1, which further comprises isolating the management computer from the public communications network by use of an access protection device.

13. The method according to claim 1, which further comprises providing a printing press as the machine in the graphics industry.

14. The method according to claim 1, which further comprises upon a request from an operator of the machine, transmitting licenses for enabling selected functions of the machine from the management computer to the control computer assigned to the machine.

15. The method according to claim 1, which further comprises during a commissioning of the machine by the control computer assigned to the machine, checking licenses for validity, and in that functions of the machine that belong to the licenses are enabled only in an event of a positive check.

16. The method according to claim 15, which further comprises time-limiting a period during which the functions are enabled.

17. The method according to claim 15, which further comprises providing at least some of the operational data from sensors on the machine of the graphics industry.

\* \* \* \* \*